United States Patent [19]

Shafer

[11] 4,170,169
[45] Oct. 9, 1979

[54] PISTON OPERATOR FOR IMPARTING ROTARY MOTION

[76] Inventor: Homer J. Shafer, 2300 Park Ave. West, Mansfield, Ohio 44906

[21] Appl. No.: 867,797

[22] Filed: Jan. 9, 1978

Related U.S. Application Data

[63] Continuation-in-part of Ser. No. 707,720, Jul. 20, 1976, abandoned, which is a continuation-in-part of Ser. No. 615,096, Sep. 19, 1975, abandoned.

[51] Int. Cl.² ............................ F01B 9/00; F16J 11/02
[52] U.S. Cl. .................................... 92/130 R; 92/128; 92/138; 92/140; 92/169
[58] Field of Search ...................... 92/130 R, 138, 140, 92/260, 169, 128, 174, 130 D, 130 B

[56] References Cited

U.S. PATENT DOCUMENTS

| | | | |
|---|---|---|---|
| 2,758,569 | 8/1956 | Peterson | 92/130 R |
| 3,065,949 | 11/1962 | DeFrees | 92/130 R |
| 3,104,592 | 9/1963 | Sheesley | 92/140 |
| 3,219,059 | 11/1965 | Williams et al. | 92/130 R |
| 3,709,106 | 1/1973 | Shafer | 92/138 |
| 3,818,808 | 6/1974 | Shafer | 92/138 |

FOREIGN PATENT DOCUMENTS 55242   2/1891   Fed. Rep. of Germany ........ 92/130 R Primary Examiner—Paul E. Maslousky
Attorney, Agent, or Firm—Hamilton, Renner & Kenner

[57] ABSTRACT

A linear piston operator having a cylinder enclosing at least one piston, a connector bar connected to said piston and an oscillatable element operatively connecting the connector bar to a rotary shaft extending transversely and tangentially of the cylinder. The oscillatable element extends through a longitudinal slot in the cylinder wall, and the shaft end of the element is enclosed in a housing having two longitudinal reinforcing portions extending along and welded to the sides of the slot, said shaft being journaled in said reinforcing portions.

10 Claims, 9 Drawing Figures

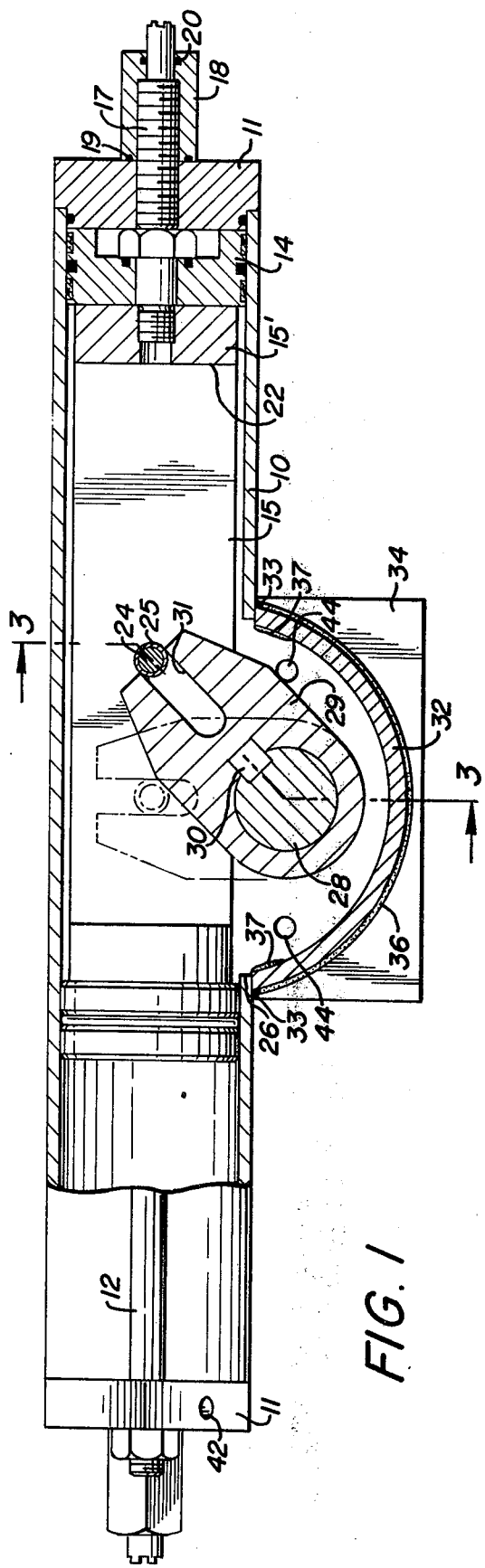
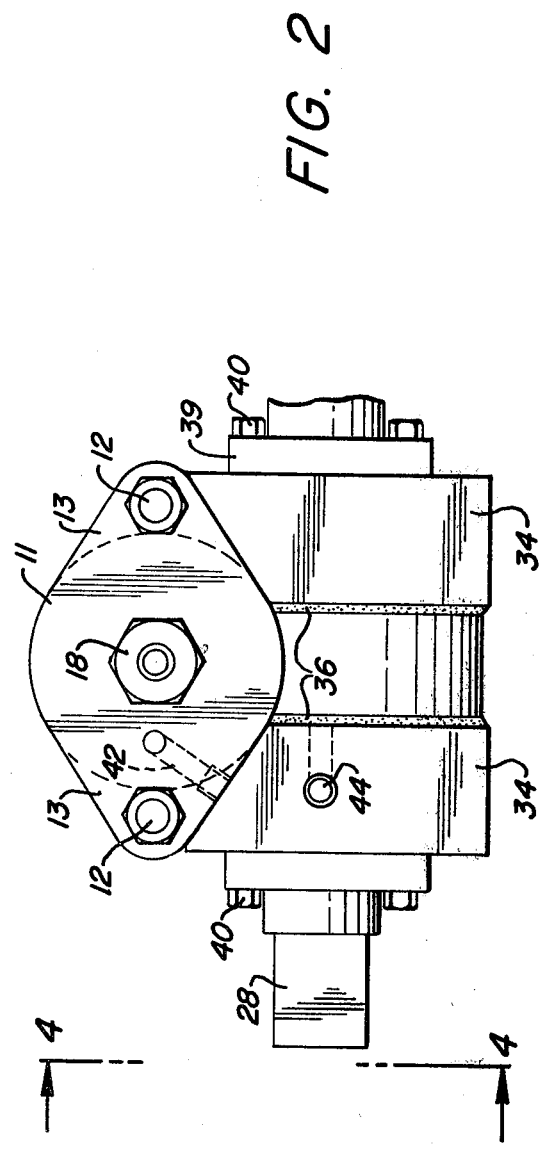
FIG. 1
FIG. 2

PISTON OPERATOR FOR IMPARTING ROTARY MOTION

CROSS-REFERENCE TO A RELATED APPLICATION

This application is a continuation-in-part of my prior application Ser. No. 707,720, filed July 20, 1976, now abandoned, which is a continuation-in-part of my prior application Ser. No. 615,096, filed Sept. 19, 1975, now abandoned.

BACKGROUND OF THE INVENTION

My U.S. Pat. No. 3,709,106 shows a linear piston operator having two axially aligned pistons connected by a bar mounting two spaced rollers for selectively engaging opposite sides of a crank arm having a collar keyed to a valve stem extending transversely through a circular notch in the piston housing, and a transverse tubular housing for the valve stem and collar cut out to conform to and enclose the notch and welded to the edges thereof. That construction provided a sealed enclosure for storing high pressure fluid in the cavity within the piston housing between the two pistons.

A disadvantage of that construction is that in an intermediate position of the valve stem between fully open and fully closed valve positions, control of the valve stem is not positive as some floating or drifting of the valve can occur because of the space between the crank arm and one of the rollers on the piston connector bar. A scotch-yoke connector having a constant sliding engagement with a single roller on the piston connector bar produces positive control of the valve in all positions, but the slot in the yoke requires substantial mass on both sides of the slot and consequent increased overall width to provide the necessary strength to absorb piston thrust. Consequently, a much larger notch in the piston housing is required to accommodate the increased width of the scotch-yoke as it oscillates between valve open and closed positions, and such notch substantially weakens the resistance of the cylinder wall to high internal pressures when high pressure fluid is stored in the cavity between the two pistons.

SUMMARY OF THE INVENTION

The improved linear piston operator for imparting rotary motion has a relatively narrow longitudinal slot to accommodate an oscillating scotch-yoke connecting the piston connecting element to the valve stem, and has an improved transverse housing enclosing the valve stem and the stem end of the scotch-yoke. The improved housing is also adapted to enclose the valve stem and the stem end of a crank arm pivotally connected to a connector bar which is pivoted to a single piston reciprocable in the cylinder.

It is an object of the present invention to provide an improved piston operator having two axially aligned pistons connected in spaced relation and a scotch-yoke extending through a longitudinal slot in the piston cylinder and connecting the piston connector to a rotary valve stem extending transversely and tangentially of said cylinder, and a housing enclosing and journaling said valve stem.

Another object is to provide an improved housing enclosing the valve stem and the stem end of the scotch-yoke and having reinforcing portions welded to and reinforcing the side edges of the longitudinal slot in the piston cylinder.

A further object is to provide an improved housing enclosing the valve stem and the stem end of the scotch-yoke and providing a sealed enclosure for the cavity within the piston cylinder between the two pistons.

A still further object is to provide an improved housing which is adapted also to enclose the valve stem and the stem end of a crank arm operatively connected to a single piston reciprocable in the cylinder.

These and concomitant objects are attained by the improvements comprising the present invention, preferred embodiments of which are shown by way of example in the accompanying drawings and described in the following specification. Various modifications and changes in details of construction are comprehended within the scope of the appended claims.

DESCRIPTION OF THE DRAWINGS

FIG. 1 is a longitudinal sectional view, partly in elevation of one embodiment of the improved piston operator, showing the scotch-yoke at one end of its stroke.

FIG. 2 is an end elevational view thereof.

DESCRIPTION OF ONE PREFERRED EMBODIMENT

Figure 3:
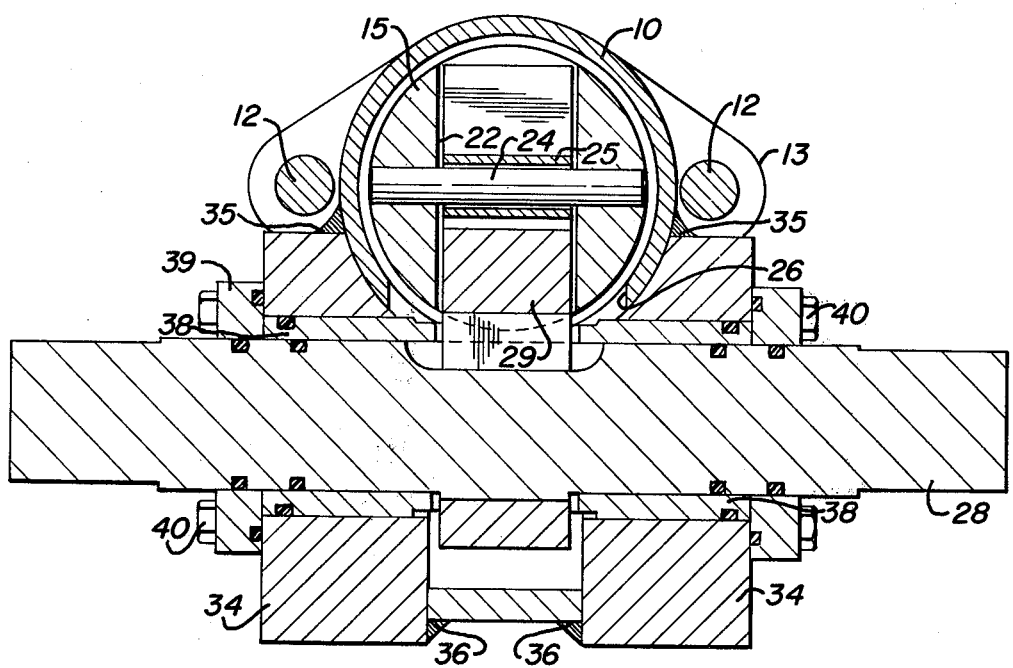
FIG. 3 is a cross-sectional view on line 3—3 of FIG. 1, showing the scotch-yoke at the middle of its stroke.
Figure 4:
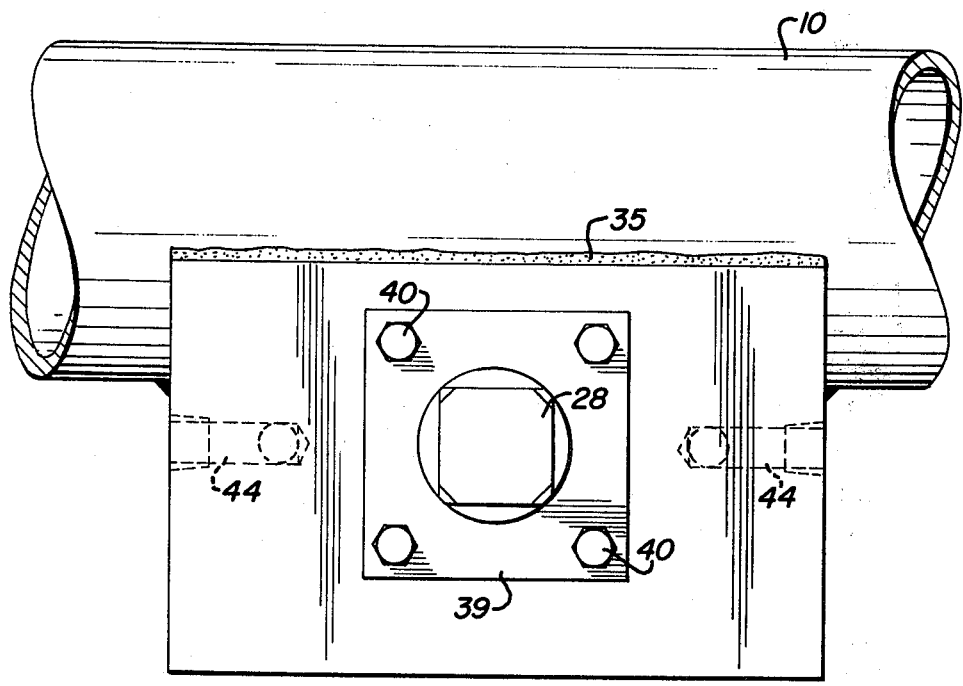
FIG. 4 is a partial side elevation on line 4—4 of FIG. 2.

The cylinder indicated generally at 10 may be formed of standard steel tubing and has end caps 11 which are held together tightly closing the ends of the cylinder by tie bolts 12 extending through diametrically opposite ears 13 on the end caps.

Within the cylinder 10 are two axially aligned pistons 14 connected in spaced relation by a bar 15 by means of bolts 16 extending through the pistons and screwed into the ends 15' of the connector bar 15. The heads of the bolts 16 are preferably recessed within the outer faces of the pistons, and are adapted to abut the inner ends of adjusting screws 17 extending through the end caps 11 for the purpose of varying the stroke of the pistons. As shown, the adjusting screws 17 preferably have sealing caps 18 which embody O-rings 19 and 20 encircling the screws.

The connector bar 15 may be circular in cross section having a diameter substantially less than the inner diameter of the cylinder, and is provided with a longitudinal slot 22 extending between the ends 15' and laterally through the bar. Midway of the ends of the slot 22 a roller mounting pin 24 extends across the slot with its ends secured in opposite sides of the bar 15, and a tubular roller 25 is journaled on pin 24 within the slot.

A longitudinal slot 26 is cut in the wall of the cylinder 10 midway of its ends and laterally opposite to the slot 22, and the valve stem 28 of a rotary valve (not shown) extends through the slot transversely of the cylinder and substantially tangentially thereto. A scotch-yoke 29 extends through slot 26 and operatively connects the valve stem 28 to the roller 25 traversing the slot 22 in the bar 15.

As shown, the scotch-yoke 29 has an end portion encircling valve stem 28 and secured thereon by a key 30. The other end of the scotch-yoke has an open slot 31 therein in which the roller 25 is movably engaged. The ends 15' of slot 22 are spaced apart sufficiently to provide clearance for the scotch-yoke at the ends of its stroke.

The housing which encloses the slot and surrounds the valve stem and scotch-yoke also provides a sealed enclosure for the cavity in the cylinder between the pistons 14 so that it can be used to store high pressure fluid. As shown, this housing may comprise a curved substantially semi-cylindrical section 32 having its axis of curvature transverse to the axis of curvature of cylinder 10 bridging over and having its ends welded at 33 to the ends of the slot 26, and said section being sandwiched between two bars 34 extending along the sides of the slot and welded at 35 to the cylinder, and at 36 to the edges of section 32.

Since extremely high pressure fluid may be stored in the cylinder between the pistons, it is necessary that the sides of the slot 26 be reinforced against spreading, and accordingly the bars 34 are required to have substantial mass and weight. For the same reason, it is desirable to provide stitch welds 37 on the interior of the ends of the curved section 32 to prevent them from bowing radially and weakening the exterior weldments 33.

Obviously, the housing surrounding the valve stem could be formed in a different manner, for example, by machining an arcuate cavity in one face of a block of steel, but the side and end portions of the block would be required to have sufficient mass to reinforce the sides of the slot against spreading due to high internal pressures.

As shown in FIG. 3, the valve stem 28 is journaled in the reinforcing bars 34 of the housing by means of bearing bushings 38 held in place by plates 39 abutting the outer faces of the bars 34 and secured thereto by cap screws 40. O-ring seals are provided around the stem. The substantial mass of the bars 34 provides strong and stable bearing supports for the valve stem.

In the operation of the improved piston operator of FIGS. 1-4, assuming that the scotch-yoke is in the full line position of FIG. 1, pressure fluid is introduced through a port 42 in the right hand end cap 11 and exhausted through a duplicate port 42 in the other end cap. This causes the pistons 14 to move to the left and the roller 25 and scotch-yoke 29 to rotate the valve stem 28 counterclockwise as viewed in FIG. 1. If it is desired to hold the valve stem in a position intermediate the open and closed position of the valve, shutting off the fluid pressure to the cylinder positively holds the valve stem in the desired position because the engagement of the roller 25 in the slot 31 prevents floating of the valve.

The cavity in the cylinder 10 between pistons 14 may be utilized for storing a supply of pressure fluid because the housing comprising the arcuate section 32 and the bars 34 provides a sealed enclosure over the slot 26. Preferably, angular ports 44 are provided in one of the bars 34 for communicating with the pressure fluid in this cavity. Because of the reinforcement around the slot 26 by the housing enclosing it, fluid at extremely high pressure may be stored. One use for such stored pressure fluid is in case the pressure supply to operate the pistons fails, in which case the stored pressure may be connected to one of the ports 42 to rotate the valve stem 28 and operate the valve.

DESCRIPTION OF A SECOND PREFERRED EMBODIMENT

The cylinder indicated generally at 110 may be constructed the same as cylinder 10 of standard steel tubing with end caps 111 held together by tie bolts 112. Reciprocable within cylinder 110 is a single piston 114 having a transverse wrist pin 145 therein pivotally connected to one end of a connector bar 146. The other end of bar 146 is a clevis 147 pivotally connected by pin 148 to one end of an oscillatable crank arm 149 having its other end welded to a collar 150 encircling the valve stem member 128 and non-rotatively secured thereto by keys 130.

Preferably, the end caps 111 have adjusting screws 117 therein for abutting the end of the crank arm 149 at one end of the cylinder and the face of piston 114 at the other end of the cylinder, so that the stroke of the piston may be varied.

A longitudinal slot 126 is cut in the wall of the cylinder 110 adjacent one end thereof, and the valve stem member 128 extends through the slot transversely of the cylinder and substantially tangentially thereto. The crank arm 149 extends through said slot 126.

The housing which encloses the slot 126 and surrounds the valve stem member 128 and crank arm 149 is constructed similarly to the housing of FIGS. 1–4 and provides a sealed enclosure for the chamber in the cylinder on the inner side of piston 114. The housing preferably comprises a curved substantially semi-cylindrical section 132 having its axis of curvature transverse to the axis of curvature of cylinder 110, bridging over and having its ends welded to the ends of the slot 126, and said section being sandwiched between two bars 134 extending along the sides of the slot and welded at 135 to the cylinder and at 136 to the edges of section 132.

Figure 7:
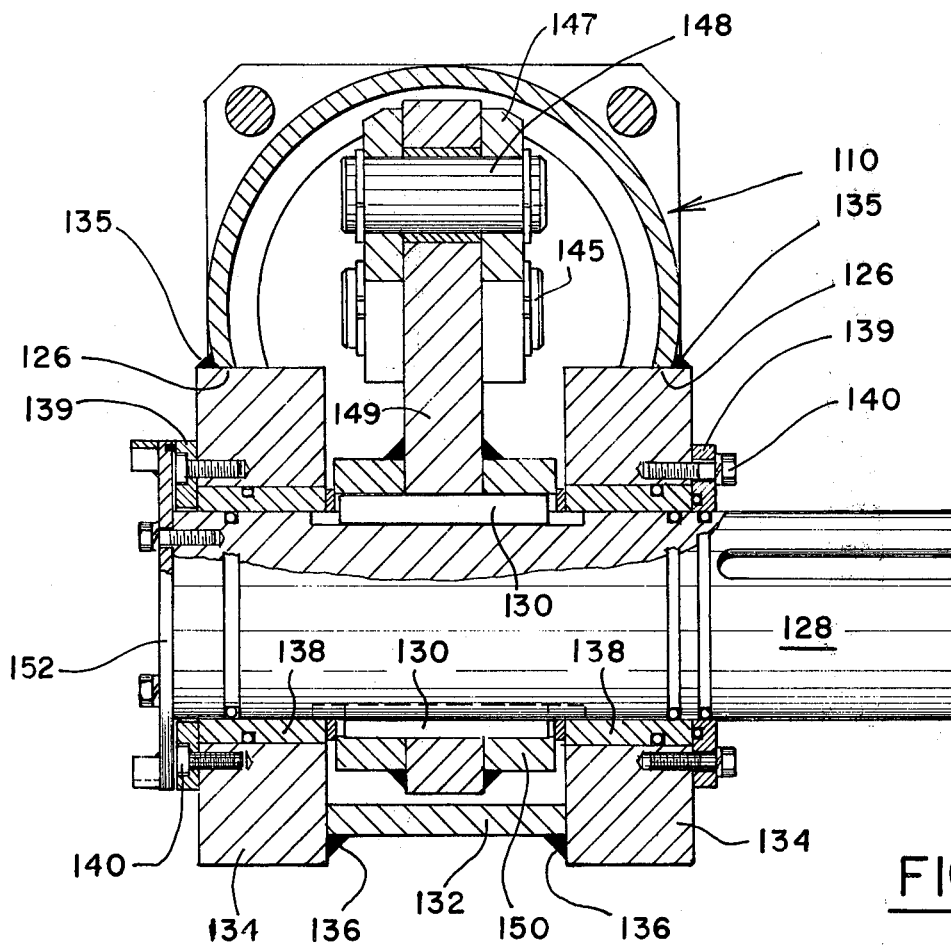
FIG. 7 is a cross-sectional view on line 7—7 of FIG. 6 showing the crank arm at the middle of its stroke.

As shown in FIG. 7, the reinforcing bars 134 extend into the cylinder 110 at their inner ends, as the cylinder 110 is of relatively larger diameter than cylinder 10 and the slot 126 is deeper than slot 26. Thus, the bars 134 have increased depths so as to give increased reinforcement to the cylinder against bellying out under pressure. Cap screws 137 may be provided to tie the bars 134 together within the ends of curved section 132.

The valve stem member 128 is journaled in the reinforcing bars 134 of the housing by bearing bushings 138 held in place by plates 139 abutting the outer faces of the bars 134 and secured thereto by cap screws 140. O-ring seals are provided around the stem member. An indicator plate 152 may be secured to the end of valve stem member 128 for indicating the position of the valve (not shown) to which it is connected.

Figure 5:
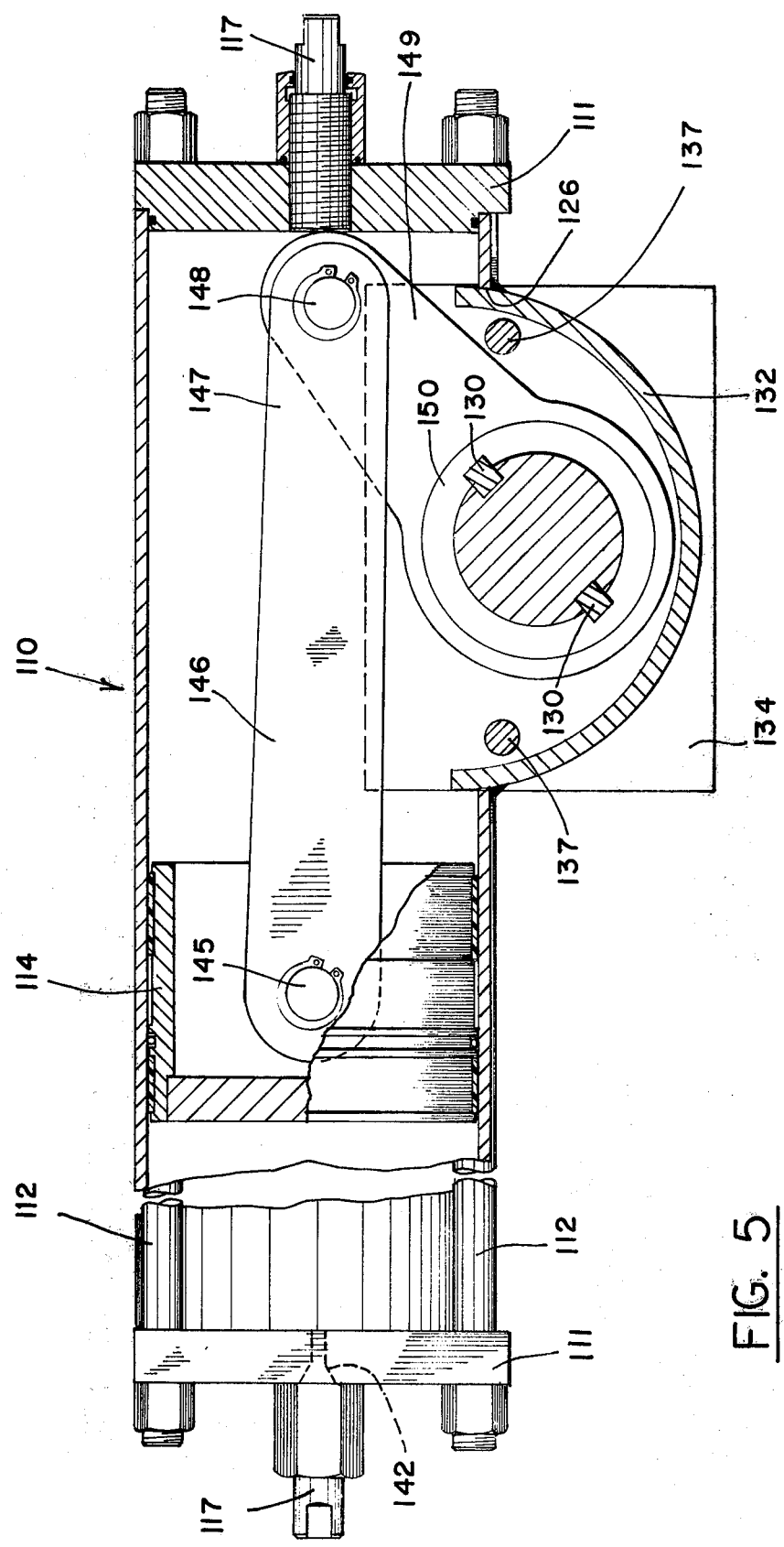
FIG. 5 is a longitudinal sectional view, partly in elevation, of another embodiment of the improved piston operator having a single piston within the cylinder, and a connector bar and crank arm connecting the piston to the valve stem element enclosed within the improved housing.
Figure 6:
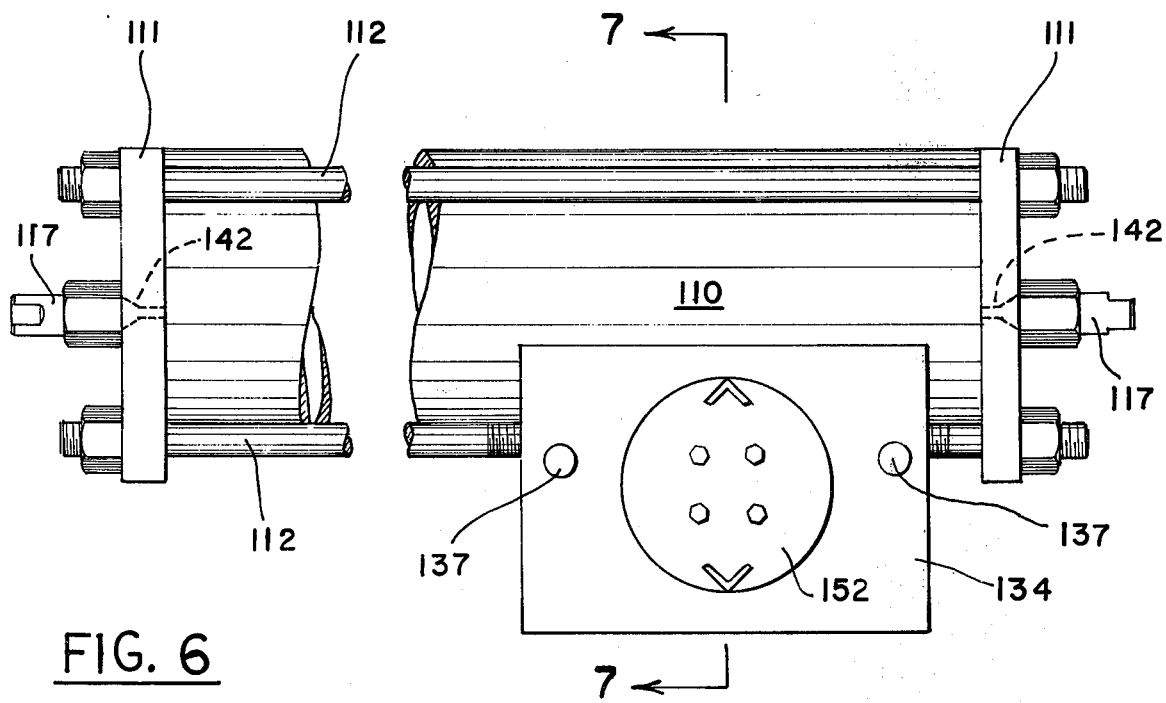
FIG. 6 is a side elevation with parts broken away.

In the operation of the piston operator of FIGS. 5–7, assuming that the piston 114 is in the position of FIG. 5, pressure fluid is introduced through a port 142 in the right hand end cap 111 and exhausted through a duplicate port 142 in the other end cap, causing the piston 114 to move to the left and rotate the crank arm 149 counterclockwise. The crank arm connection with connector bar 146 provides for positively holding the valve stem member 128 in an intermediate position if desired.

While the construction of FIGS. 5-7 produces maximum torque at the center of the stroke rather than at the beginning, sufficient starting torque is readily obtained by increasing the diameter of the piston and cylinder, and the increased size of the cylinder enables extending the reinforcing bars farther into the cylinder to reinforce it against bellying out under high internal pressure.

Moreover, the construction of FIGS. 5-7 is easily assembled by connecting the piston, connector bar and crank arm together, and then inserting them, crank arm first, through the left end of the cylinder. When the crank arm reaches the arcuate chamber formed by section 132 between the bars 134 it drops down into the chamber in position to receive the valve stem shaft 128 which is then inserted transversely of the chamber. To disassemble, this procedure is reversed.

DESCRIPTION OF A THIRD PREFERRED EMBODIMENT

The cylinder indicated generally at 210 may be of standard steel tubing having an end cap 211 welded to one end and a bolt ring 260 welded around its outer surface at its other end. An annular connector flange 261 is secured to the bolt ring by screw studs 262 and the radially outer periphery of the connector flange is secured to one end of a cylinder 263 preferably of larger diameter than cylinder 210 and axially aligned therewith.

Since the cylinders 210 and 263 are connected end-to-end in communication with each other, they function equivalent to a single cylinder.

The connector flange 261 may be secured by screw studs 264 to a bolt ring 265 welded around the outer surface of cylinder 263 at its near end, and an end cap 266 may be secured by screw studs 264' to a similar bolt ring 265' welded around the outer surface of the cylinder at its other end. Suitable ports 242 may be provided in end caps 211 and 266 for introducing and exhausting pressure fluid.

Reciprocable within the cylinder 263 is a piston 214 having a clevis 267 welded to its interior surface and pivotally connected to one end of a connector bar 246 by a wrist pin 245. The other end of the bar 246 is pivotally connected by a pin 248 to the outer end of an oscillatable crank arm 249 having a splined insert sleeve 268 in its inner end keyed to the valve stem 228. The relatively large diameter of cylinder 263 and piston 214 increases the effective pressure area of the piston thereby increasing the rotating force applied to the valve stem 228. The depth and diameter of the piston facilitates maintaining its alignment while traversing the cylinder. As shown, the end caps 211 and 266 may have adjusting screws 217 therein for abutting the end of crank arm 249 at the end of its stroke within the crank chamber and the outer face of the piston 214 at the other end of the stroke within cylinder 263 so that the stroke of the piston may be varied.

A longitudinal slot 226 is cut in the wall of cylinder 210 terminating adjacent to the end cap 211, and the valve stem 228 extends through the slot transversely of the cylinder and substantially tangentially thereto. The crank arm 249 extends through the slot 226 to connect with the valve stem.

The housing which encloses the slot 226 and surrounds the valve stem 228 and the inner end of crank arm 249 is preferably constructed similarly to the housing of FIGS. 5-7 and provides a sealed enclosure for the chamber or crank case communicating with the inner end of the piston chamber within cylinder 263. The housing preferably comprises a curved substantially semi-cylindrical section 232 having its axis of curvature transverse to the axis of curvature of cylinder 210, bridging over and having its ends welded to the ends of slot 226, and said section being sandwiched between two bars 234 extending along the sides of the slot and welded at 235 to the cylinder and at 236 to the curved section 232.

Figure 9:
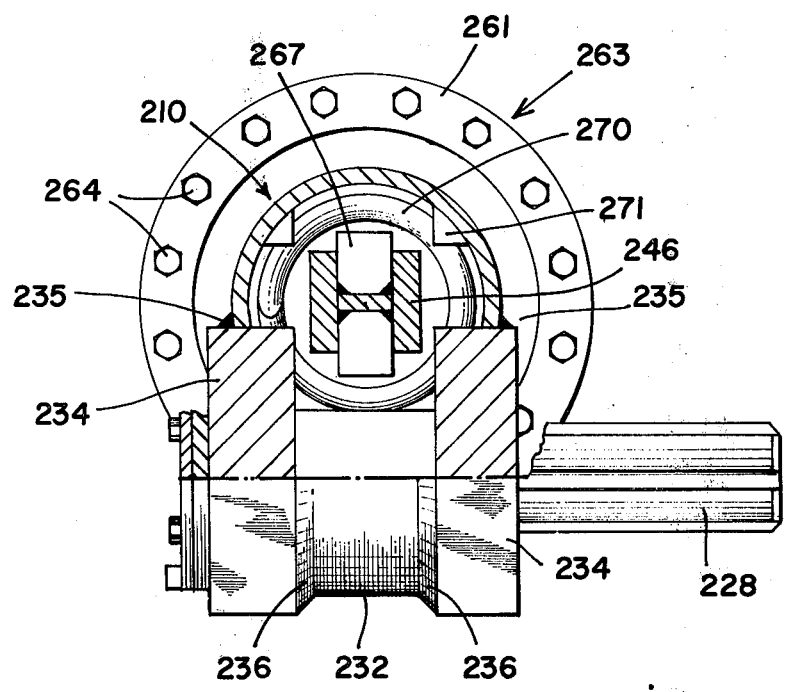
FIG. 9 is a cross-sectional view on line 9—9 of FIG. 8.

As shown in FIG. 9, the reinforcing bars 234 preferably extend laterally from the weldments 235 a substantial distance into the cylinder, and thus the bars have increased depths to give increased reinforcement to the cylinder 210 adjacent to the slot 226 against bellying outward under internal pressure within the crank case. Transverse web bars 268' may be provided with their ends welded to the reinforcing bars 234 to tie the bars together within the ends of curved section 232.

The valve stem 228 may be journaled in the reinforcing bars 234 in the same manner as valve stem 128 is journaled in the bars 134 in the embodiment of FIGS. 5-7.

In this embodiment a compression spring 270 is interposed between the inner side of the piston and the crank case with its end opposite to the piston preferably abutting the ends of the reinforcing bars 234 extending into the cylinder 210. Additional stops or abutments 271 may be welded to the internal surface of cylinder 210 at a location or locations substantially opposite to the ends of bars 234 which abut the end of spring 270. The spring 270 is pre-compressed when it is inserted in cylinder 263 so that when the piston 214 bottoms against the end cap 266 or the adjusting screw 217 therein, the spring will still be under compression.

Figure 8:
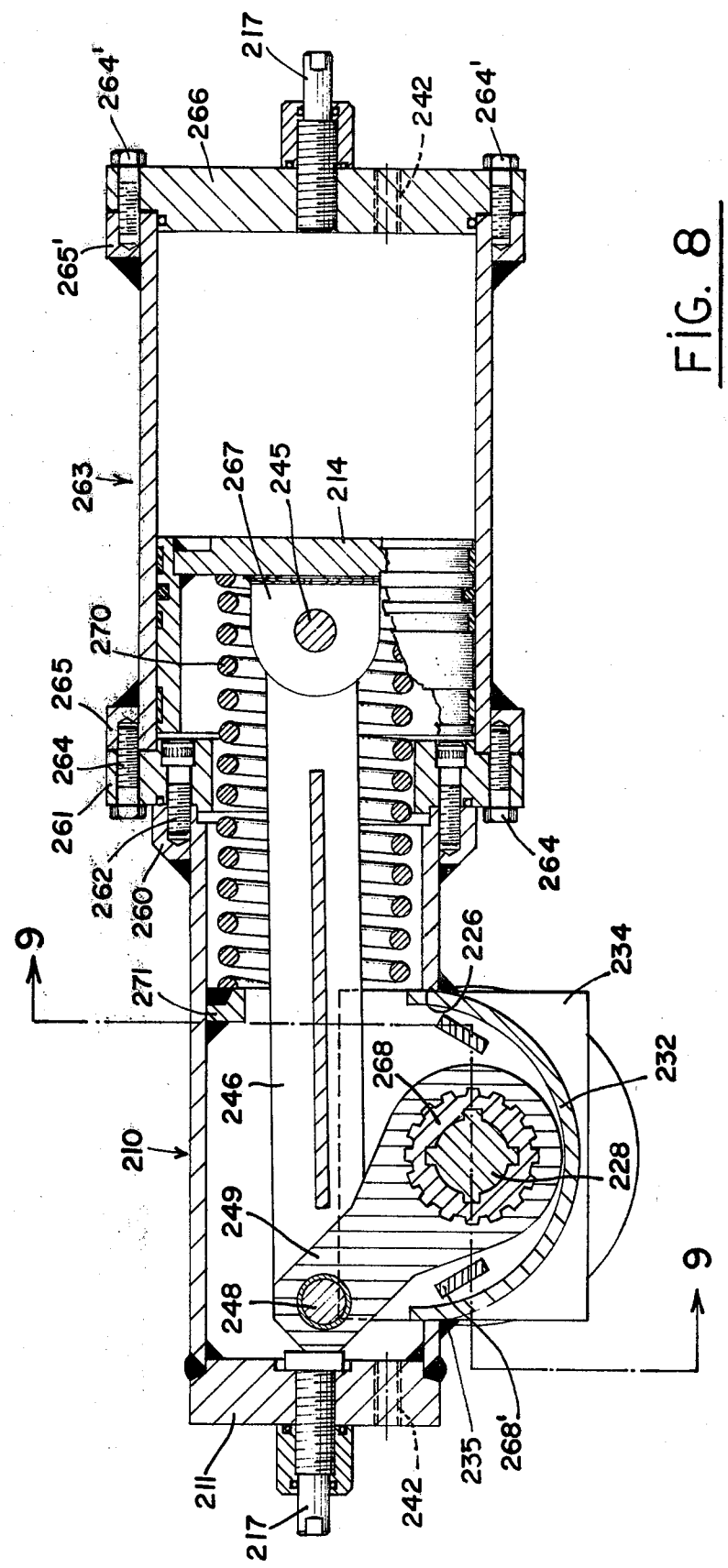
FIG. 8 is a longitudinal sectional view of a third embodiment of the improved piston operator having a single piston, with a connector bar and crank arm connecting the piston to the valve stem, and a compression spring within the crank case acting against the inside of the piston.

In the operation of the piston operator of FIGS. 8 and 9, assuming that the piston is in the position of FIG. 8 and the main valve having stem 228 is open, normally the cylinder 210 would contain fluid under pressure and cylinder 263 would contain fluid under pressure sufficient to hold the piston opposed by the spring in position and the main valve open. When pressure in cylinder 263 is exhausted through port 242 in end cap 266, the piston will move to the right and close the valve, and when flow is reversed fluid pressure introduced through the port will move the piston to the left, recompressing the spring and reopening the valve.

As long as the cylinder 210 contains fluid pressure the pressure of spring 270 is not required to close the valve when pressure fluid is exhausted from cylinder 263 behind the piston, but in the event the pressure in cylinder 210 fails or is not maintained for any reason, the spring acts as an auxiliary element to move the piston and close the valve.

I claim:

1. A linear piston operator for a rotary valve having a single cylinder, a piston in said cylinder, a connector bar connected to said piston, a rotary valve stem member extending transversely and substantially tangentaially of said cylinder, said cylinder having a longitudinal slot adjacent said valve stem, an oscillatable element operatively connecting said connector bar to said valve stem member and extending through said slot during oscillation, a housing partially surrounding said stem member and bridging over the slot and having its ends welded to the cylinder at the ends of said slot, said housing having two longitudinal side bar portions welded to the cylinder along the sides of said slot, said side bar portions extending laterally from their weldments a substantial distance into said cylinder to increase reinforcement thereof.

2. A linear piston operator for a rotary valve as defined in claim 1, wherein the cylinder has two axially aligned spaced-apart pistons therein, and the connector bar connects the two pistons.

3. A linear piston operator for a rotary valve as defined in claim 1, wherein the valve stem member is journaled in the two longitudinal side bars.

4. A linear piston operator for a rotary valve as defined in claim 1, wherein the housing forms a sealed enclosure for a pressure fluid storage cavity between the two pistons.

5. A linear piston operator for a rotary valve as defined in claim 1, wherein the oscillatable element is a crank arm secured to the valve stem member and pivotally connected at its outer end to the connector bar.

6. A linear piston operator for a rotary valve as defined in claim 5, wherein the valve stem member is journaled in the two longitudinal side bars.

7. A linear piston operator for a rotary valve as defined in claim 5, wherein the housing forms a sealed enclosure at one side of the piston, and the ends of the cylinder have ports for introducing and exhausting pressure fluid.

8. A linear piston operator for a rotary valve as defined in claim 6, wherein the crank arm connector bar and piston are so constructed that they can be assembled and then inserted through one end of the cylinder, after which the valve stem member is inserted through the longitudinal bars and the crank arm.

9. A linear piston operator for a rotary valve having a cylinder, a cup-shaped piston including an end wall in said cylinder, a connector bar pivotally connected to an inner face of said end wall, a rotary valve stem member extending transversely and substantially tangentially of said cylinder, said cylinder having a longitudinal slot adjacent said valve stem, an oscillatable element operatively connecting said connector bar to said valve stem member and extending through said slot, a housing partially surrounding said stem member and bridging over said slot and having its ends welded to the cylinder at the ends of said slot, said housing having two longitudinal side bar portions welded to the cylinder along the sides of the slot, spring abutments on the interior surface of the cylinder at one end of said slot, and a compression spring surrounding said connector bar and interposed between said abutments and the inner face of said piston.

10. A linear piston operator as defined in claim 9, wherein said side bar portions extend laterally from their weldments a substantial distance into the interior of said cylinder, and the interior ends act as abutments for the end of said spring.

* * * * *